H. R. HOLMES.

POWER TRANSMISSION MECHANISM.

APPLICATION FILED SEPT. 15, 1919.

Reissued Mar. 2, 1920.

14,808.

4 SHEETS—SHEET 1.

Inventor

Harleigh R. Holmes.

By

Attorney

H. R. HOLMES.

POWER TRANSMISSION MECHANISM.

APPLICATION FILED SEPT. 15, 1919.

Reissued Mar. 2, 1920.

14,808.

4 SHEETS—SHEET 2.

Inventor
Harleigh R. Holmes.

Attorney

H. R. HOLMES.

POWER TRANSMISSION MECHANISM.

APPLICATION FILED SEPT. 15, 1919.

Reissued Mar. 2, 1920.

14,808.

4 SHEETS—SHEET 3.

Inventor

Harleigh R Holmes.

By

Attorney

H. R. HOLMES.

POWER TRANSMISSION MECHANISM.

APPLICATION FILED SEPT. 15, 1919.

Reissued Mar. 2, 1920.

14,808.

4 SHEETS—SHEET 4.

Inventor

Harleigh R. Holmes.

By

UNITED STATES PATENT OFFICE.

HARLEIGH R. HOLMES, OF DENVER, COLORADO.

POWER-TRANSMISSION MECHANISM.

14,808. Specification of Reissued Letters Patent. Reissued Mar. 2, 1920.

Original patent a continuation of application Serial No. 87,345, filed March 28, 1916. Original No. 1,289,763, dated December 3., 1918, Serial No. 165,176. filed April 28, 1917. Application for reissue filed September 15, 1919. Serial No. 323,983.

*To all whom it may concern:*

Be it known that I, HARLEIGH R. HOLMES, a citizen of the United States, residing at the city and county of Denver, State of Colorado, have invented certain new and useful Improvements in Power-Transmission Mechanisms; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in power transmission mechanism, being more especially intended for use in connection with automobiles, motorcycles, trucks, shafting, transmission reductions and stepups, and in many other relations where it is necessary or convenient to move the axis of rotation of the driving or driven member with respect to the other member.

In my improved construction, it is possible to hold the driving member in a certain position and change the axis of rotation of the driven member about it, or to hold the driven member in a certain position and change the axis of rotation of the driving member within it.

Power may also be applied to either one of these members, and in that case the other member would, of course, be the driven member. In other words, as a broad proposition, the two members may be alternately employed to perform the driving and driven functions.

The invention in this application which is for the most part a continuation of my previous application, Serial No. 87,345, filed March 28th, 1916, will be described as applied to the front wheels of an automobile, though it must be understood that the mechanism is by no means limited to this particular use.

Having briefly outlined the invention, as well as the function it is intended to subserve, I will proceed to describe the same in detail, reference being made to the accompanying drawing in which is illustrated an embodiment thereof. In this drawing.

The same reference characters indicate the same parts in all the views.

Figure 1:
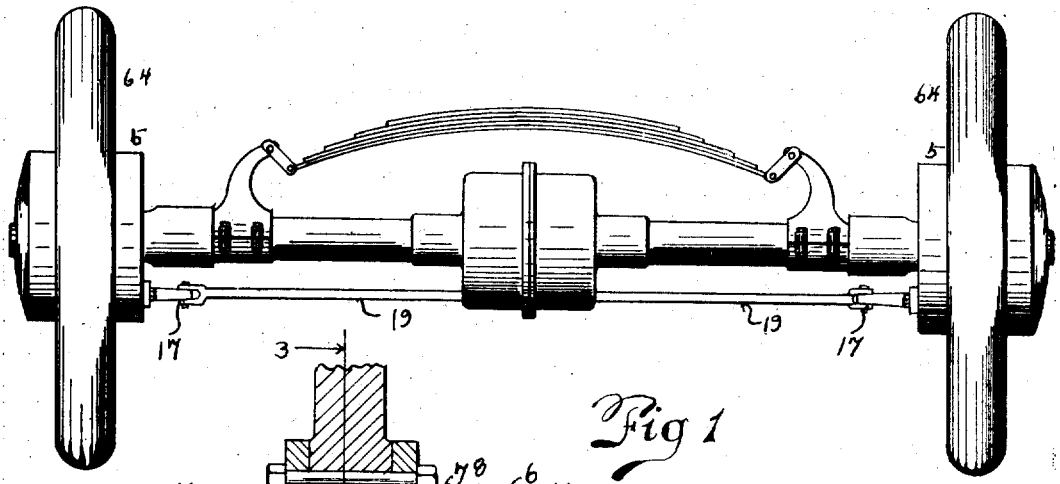
Figure 1 is an elevation or a front view of the front wheels of an automobile connected by the axle, my improvement being applied to both of said wheels.

Let the numeral 5 designate the hub of the front wheel of an automobile considered in its entirety. The outer shell 6 of this hub is mounted to rotate on bearing balls 7, the shell being provided with cone members 8 which directly engage the bearing balls, while the coöperating members 9 are threaded on the opposite ends of the inner shell 10, the latter being provided with relatively large openings 12 and 13 formed in the top and bottom thereof respectively.

Figures 5, 6, 7, 8, 9:
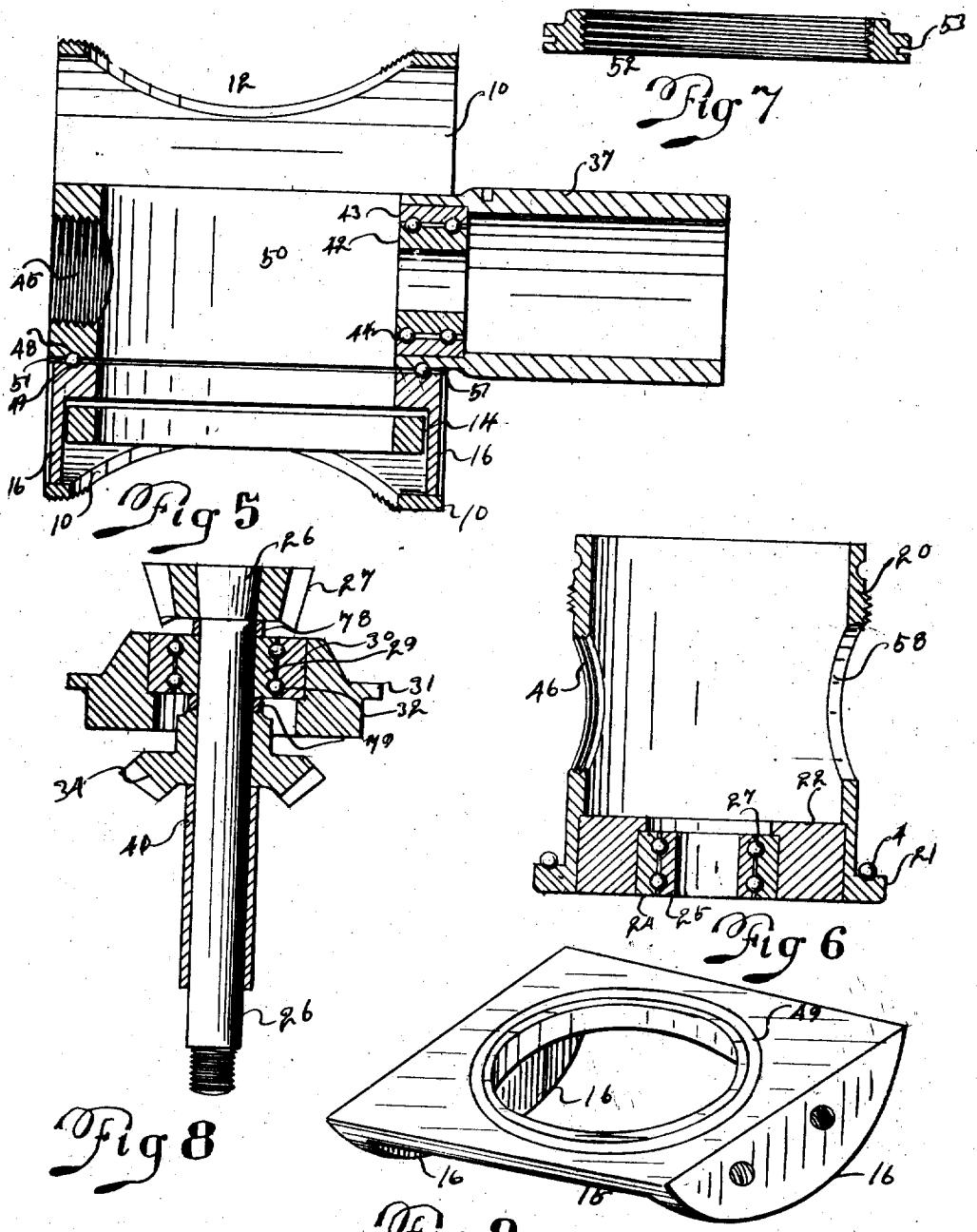
Fig. 5 is a sectional view taken through the inner cylindrical shell of my improvement, shown in connection with the eye or yoke of the front axle housing, and also in connection with the turn table through the medium of which the wheel is turned on its vertical axis for steering purposes.
Fig. 6 is a vertical section taken longitudinally through a vertically disposed cylindrical member, which, when the parts are assembled, is passed through the openings formed in the top and bottom of the shell shown in Fig. 5.
Fig. 7 is a sectional detail view of a locking ring, which, when the parts are assembled, is applied to the upper portion of the cylinder shown in Fig. 6.
Fig. 8 is a detail view of the vertically disposed driven shaft equipped with its pinions and also shown in connection with the upper ball bearing structure.
Fig. 9 is a perspective detail view of the turn table member of my improved mechanism.

Inserted through the bottom opening of this shell is a ring 14 which is horizontally disposed within the cylindrical member as best illustrated in Fig. 5. This ring on two opposite sides is slightly cut away from the top downwardly to form a shoulder which engages the adjacent portions of the shell 10 from below and locks the ring against further upward movement. The turntable member 15 is inserted in the shell 10 and is provided with segmental or rocker shaped parts 16 which engage the curved surfaces of this shell and close the otherwise open spaces beneath the bottom of the ring formed by the curvature of the shell beneath the horizontally disposed ring. This ring maintains the turntable member 15 in proper cooperative relation with the inner shell, whereby during the turning of the wheel for steering purposes, the inner shell is caused to turn and by virtue of its connection with the outer shell of the hub, turns the latter and consequently the wheel for steering purposes. A crank arm 17 is secured to one of the segments 16 of the turntable member as shown at 18 for steering purposes, this crank arm being connected by means of a rod 19 with the corresponding crank arm of the opposite wheel.

A hollow cylinder 20 is positioned within the openings 12 and 13 of the inner shell 10 to occupy a vertical position or a position with its axis perpendicular to the horizontal axis of the wheel. The lower extremity of this cylinder is provided with an exteriorly projecting flange 21 having a ball race in its upper surface which coöperates with a corresponding race in the lower surface of the ring 14, bearing balls 4 being located in the said races and between the flange 21 and the said ring. By virtue of this construction, the inner shell 10 carrying the ring 14 as heretofore explained, is allowed to turn freely while the cylinder 20 remains stationary during the steering movement of the wheel.

Within the bottom or lower extremity of the cylinder 20, is secured a bearing member 22, its upper portion engaging a slight shoulder 23 on the cylinder, this bearing member being equipped with a ring 24 provided with ball races which coöperate with races formed in the bearing member 25 mounted on a vertically disposed shaft or spindle 26, bearing balls 27 being arranged between the bearing member of the shaft and the bearing member of the cylinder, whereby the shaft 26 is allowed to turn freely and with a minimum of friction within the cylinder where it is centrally disposed for the proper performance of its function as hereinafter stated. The upper extremity of the shaft 26 is equipped with a pinion 27 which is secured thereto by means of a key 28. The upper portion of the shaft 26 just below the pinion 27 is equipped with a bearing member 29 which is fast thereon and provided with ball races which coöperate with races formed in a bearing member 30 secured within a main bearing member 31, the latter being applied to and within the upper extremity of the cylinder 20. Between the bearing members 29 and 31, two sets of bearing balls 32 are arranged. Below the ball bearing structure just described and secured to the shaft 26 by means of a key 33, is a pinion 34 which meshes with a similar pinion 35 fast on the inner extremity of the driving shaft 36 of the automobile, said driving shaft being arranged within a cylindrical housing 37 within which is secured a bushing 38 by means of fastening rivets 39 (see Fig. 2). The top pinion 27 of the shaft 26 is spaced from the bearing member 29 by a short sleeve 78, the last named bearing member being also spaced from the gear 34 by a similar sleeve 79; while a spacing sleeve 40 is arranged on the shaft 26 between the gear 34 and the bearing member 25. The shaft 26 is secured in place and in proper cooperative relation with the mechanism heretofore described, by a nut 41 applied to its lower extremity and screwed tightly against the bearing member 25.

Figure 4:
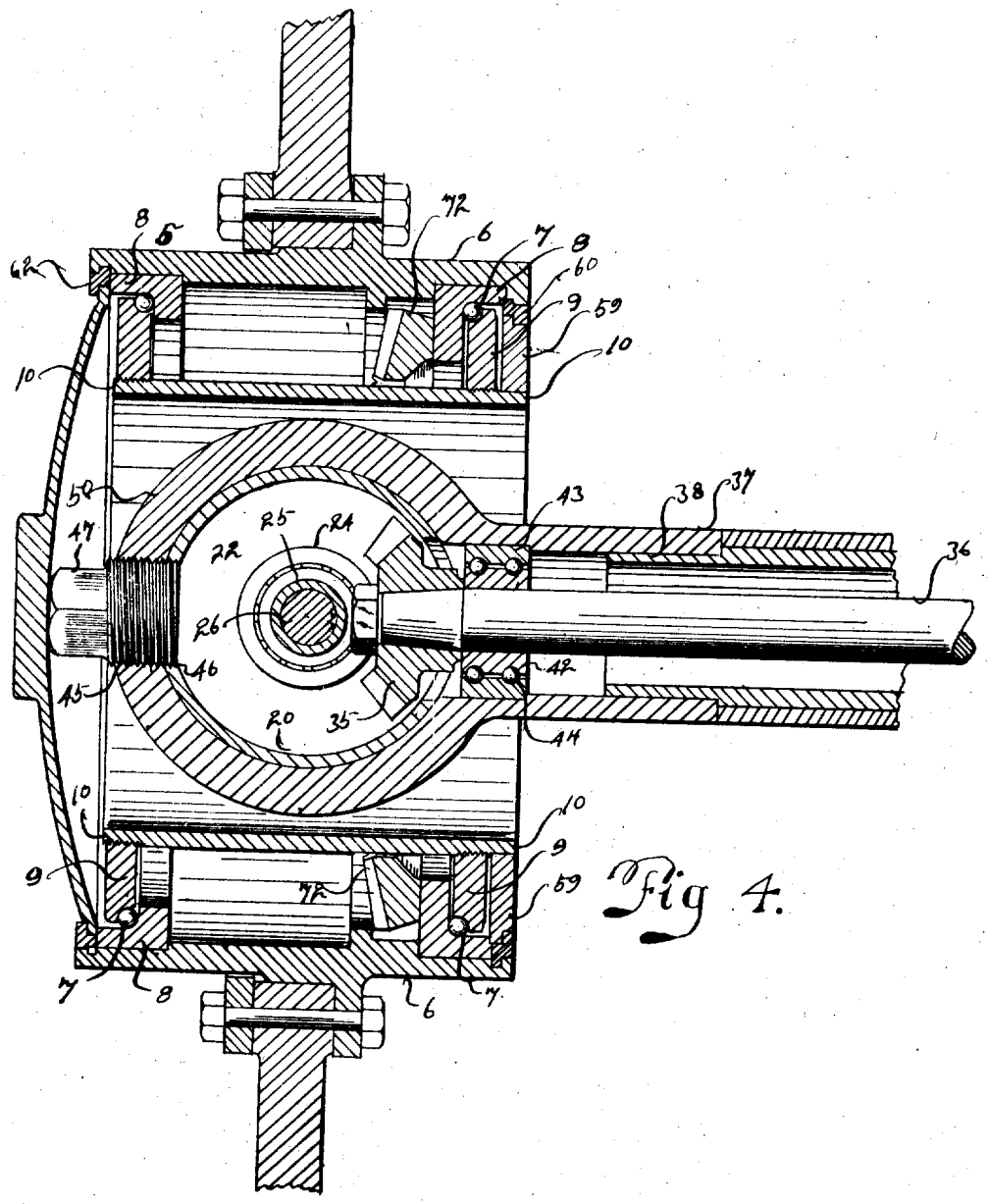
Fig. 4 is a horizontal section of the hub equipped with my improvement, taken on the line 4—4, Fig. 2.

The inner extremity of the driving shaft 36 is spaced from its housing 37 by means of bearing members 42 and 43, the former being secured to the shaft and the latter to the housing, two sets of bearing balls 44 being arranged between the said bearing members. The inner extremity of the housing 37 merges into a horizontally disposed cylindrical eye or yoke 50 which fits closely around the vertically disposed cylinder 20, this eye on the opposite side from the inner extremity of the shaft 36 being provided with an opening 45 which registers with an opening 46 formed in the cylinder 20, the eye or yoke being connected with the cylinder by a screw plug 47, Fig. 4. The lower surface of the eye or yoke 50 is provided with a ball race 48 which coöperates with a similar race 49 formed in the upper surface of the turn table 15, bearing balls 51 being arranged between the said eye or yoke and the turntable. By virtue of this construction the turntable, together with the inner shell 10, the outer shell 6 and the entire wheel may be turned for steering purposes with a minimum of friction.

The cylinder 20 is secured in proper cooperative relation with the ring 14, by means of a locking ring 52, which is threaded on the upper portion of the cylinder above the eye or yoke 50. It will be understood that when the structure is in use in the relation herein specifically described, the yoke 50, together with the cylinder 20 and its connections, will be held relatively stationary during the steering movement of the wheel. As shown in the drawing, the locking ring 52 is provided at suitable intervals with recesses 53 into one of which a locking device 54 may be inserted, when the ring is properly adjusted, the opposite end of the locking device being secured to the housing 37 by means of a stud bolt 55.

The upper portions of the openings in the ends of the inner shell 10, are closed by a cylindrical member 56 which is inserted through the top opening 12 of the inner shell and made fast therein, bearing balls 57 being arranged in suitable race ways formed in the member 56 and the adjacent upper portion of the cylinder 20, whereby the friction between the structure turned on the vertical axis for steering purposes, is further reduced.

Attention is called to the fact that the cylinder 20 has a relatively large opening 58 directly opposite the opening 46, the opening 58 being of sufficient size to make room for the pinion hub 35.

The opening of the outer shell 6 on the inside and surrounding the inner shell 10, is closed by a ring 59 which surrounds the inner extremity of the shell 10 and is held in place by a retaining ring 60. The opening in the outer shell 6 is closed on the outside by means of a cover plate 61 which is held in place by a retaining ring 62. This cover plate is outwardly curved from the end of the shell 6 (see Fig. 2).

Figure 2:
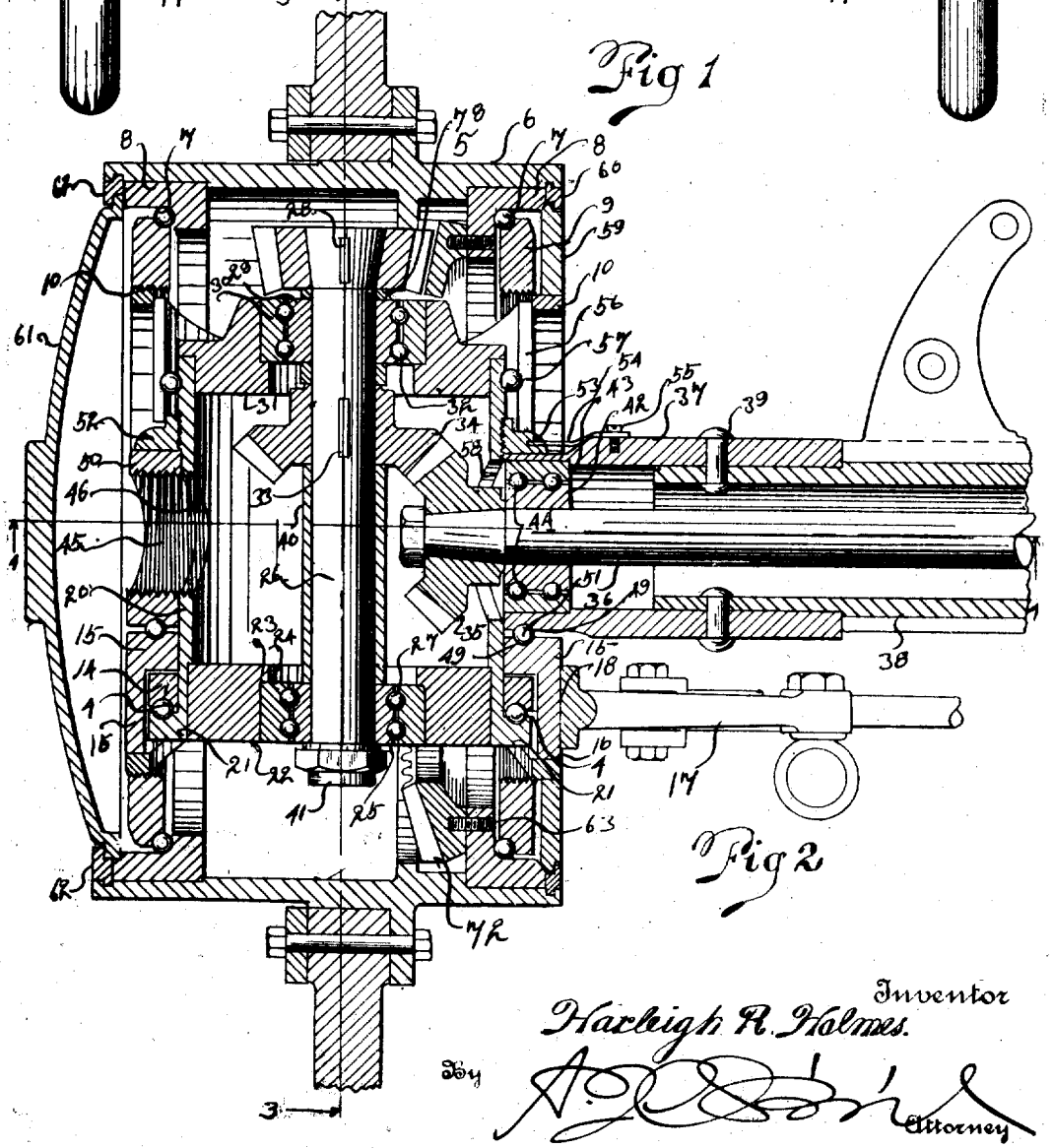
Fig. 2 is a vertical section taken through the hub of one of the wheels to which my improvement is applied, the section cutting the horizontal axis of the wheel longitudinally, the parts being shown on a much larger scale than in Fig. 1. This is a section taken on the line 2—2 Fig. 3.
Figure 3:
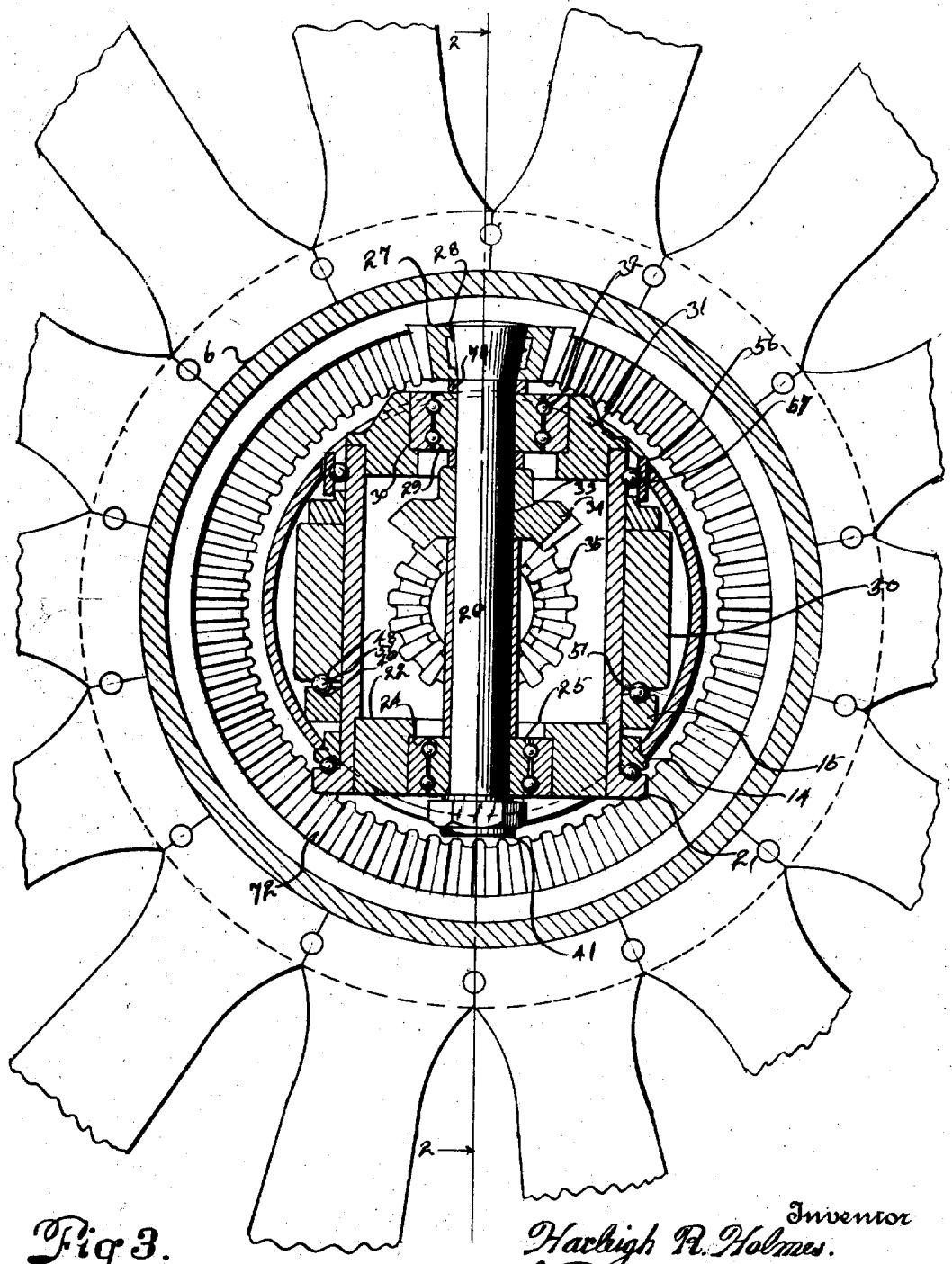
Fig. 3 is a section taken through the hub of one of said wheels, cutting the horizontal axis of the wheel at right angles. This is a section taken on the line 3—3 Fig. 2 looking toward the right.

The pinion 27 which is fast upon the upper extremity of the vertically disposed shaft or spindle 26 as heretofore described, meshes with a large gear 72 which is secured to the outer shell 6 by means of bolts or other suitable devices 63 which, as shown in the drawing, are passed through the inner bearing member 8 of the shell, as shown in Fig. 2.

When the structure is a front drive for automobiles which is the specific use heretofore described, as the shaft 36 is rotated through the medium of the power as an internal combustion engine carried by the machine, rotary motion is transmitted to the vertical shaft 26 through the medium of the pinions 35 and 34, and since the pinion 27 is also fast on the shaft 26, rotary motion is imparted through the medium of the large gear 72, to the wheel 64. When, however, it is necessary to turn the wheel on its vertical axis for steering purposes, the power through the medium of the rod 19 and the crank 27, is directly applied to the turn table member 15, whereby the inner shell 10, together with the outer shell 6, and the entire wheel connected with said shell, are turned on the vertical axis of the wheel, while the shaft 26 and its connections, including the cylinder 20, maintain their normal position with reference to the shaft 36, the housing 29 and the yoke or eye 50. It will thus be seen that the power is applied to the wheel when shifted on its vertical axis for steering purposes to the same advantage as when the plane of the same is at right angles to the driving shaft, or when the machine is running on a straight track. This is an important feature of my improved construction. In other words, the vertical axis of the wheel during the turning movement for steering purposes is in a central position, and consequently the power is applied to equal advantage at all times.

I claim:

1. Transmission mechanism comprising a horizontal shell, a hub rotatable about said shell, a turntable in the bottom of the shell, an axle having an eye mounted on said turntable, a vertical hollow pivoting member positioning said eye on said turntable, a vertical driving shaft mounted within the hollow pivot, extending through said shell, and having means on its upper end to engage and drive the hub, and driving means extending horizontally into said eye to engage and drive said vertical driving shaft.

2. Transmission mechanism, comprising a horizontal shell, a hub rotatable about said shell, a turntable in the bottom of the shell, an axle having an eye mounted on said turntable, a vertical hollow pivoting member positioning said eye on said turntable, a vertical driving shaft mounted within the hollow pivot, extending through said shell and having means on its upper end to engage and drive the hub, and driving means extending horizontally into said eye through said hollow pivoting member to engage and drive said vertical driving shaft.

3. Transmission mechanism, comprising a horizontal shell, a hub rotatable about said shell, a turntable in the bottom of the shell, an axle having an eye mounted on said turntable, a vertical hollow pivoting member positioning said eye on said turntable, a vertical driving shaft mounted within the hollow pivot, extending through said shell and having means on its upper end to engage and drive the hub, and driving means extending horizontally into said eye to engage and drive said vertical driving shaft, the pivoting member being rotatable with the eye.

4. Transmission mechanism, comprising a hub, an annularly arranged shell positioned within the confines of the hub, the hub being mounted to rotate around the shell, a shaft centrally located with reference to the shell and having its axis perpendicular to that of the shell, means for mounting the shaft within the shell, another shaft whose axis is perpendicular to that of the first named shaft, and an operative driving connection between the two shafts and between the first named shaft and the hub.

5. Mechanism of the class described, including an outer shell, an inner annularly arranged shell positioned within the confines of said outer shell, the outer shell being mounted to rotate around the inner shell, means for supporting the inner shell within the outer shell, a shaft centrally located with reference to the inner shell and having its axis perpendicular to that of the said shell, means for mounting said shaft within the inner shell, another shaft whose axis is perpendicular to that of the first named shaft, and an operative gearing connection between the two shafts and between the first shaft and the outer shell.

6. Mechanism of the class described, including an outer shell, an inner annularly arranged shell, the outer shell being mounted to rotate around the inner shell, means for supporting the inner shell within the outer shell, a shaft centrally located with reference to the inner shell and having its axis perpendicular to that of the said shell, means for mounting said shaft within the inner shell, another shaft whose axis is perpendicular to that of the first named shaft, and an operative gearing connection between the two shafts and between the first shaft and the outer shell.

7. A wheel having a hub including an outer shell and a shell annularly arranged within and spaced from the outer shell, and a connection between the two shells to allow the outer shell to rotate around the inner shell on the common axis, while the inner shell remains stationary, and to allow the two shells to swing on an axis perpendicular to the normal axis of rotation of the outer shell.

8. A wheel having a hub including an outer shell, an inner shell annularly arranged and spaced from the outer shell to allow the latter to rotate on the common axis while the inner shell remains relatively stationary, a hollow cylinder disposed within the inner shell to cause its axis to occupy a position perpendicular to that of the two shells, and a connection between the cylinder and the inner shell to allow the two shells to swing on the axis of the cylinder while the latter remains stationary.

9. Mechanism of the class described, including an outer cylindrical shell, an inner annularly arranged shell, a connection between the two shells to allow the outer shell to rotate on the common axis while the inner shell remains stationary, a cylinder disposed within the inner shell on an axis perpendicular to that of said shell, a shaft disposed within the cylinder and having a common axis, means for mounting the shaft within the cylinder to allow the shaft to rotate while the cylinder remains stationary, an operative connection between the shaft and the outer shell to cause the latter to rotate on the axis common to the two shells, and means for swinging the two shells on the axis of the said shaft while the shaft and cylinder remain relatively stationary.

10. In combination, an outer shell, an inner annularly arranged shell, a connection between the two shells to allow the outer shell to rotate on the common axis while the inner shell remains relatively stationary, the inner shell having openings in the top and bottom thereof respectively, a horizontal ring mounted in and surrounding the bottom opening of the shell, a turntable arranged above said ring and having segments fitting the inner curvature of the shell on opposite sides of the ring, a yoke arranged above the turntable, and means for connecting the cylinder to the yoke to allow the turntable and shell to swing on the axis of the cylinder while the latter remains stationary.

11. In combination, an outer shell, an inner shell annularly arranged, a connection between the two shells to allow the outer shell to rotate on the common axis while the inner shell remains stationary, the inner shell having openings formed in its top and bottom respectively, a horizontal ring mounted in and surrounding the bottom opening of the shell, a turntable arranged above said ring and having segments fitting the inner curvature of the shell on opposite sides of the ring, a yoke arranged above the turntable, means for connecting the cylinder with the yoke to allow the turntable and shell to swing on the axis of the cylinder while the latter remains stationary, a shaft located within the cylinder and having a common axis, a gearing connection between the said shaft and the outer shell, and a second shaft whose axis is perpendicular to that of the first named shaft, and an operative gearing connection between the two shafts.

12. Transmission mechanism comprising a horizontal shell, a hub rotatable about the shell, a turntable in the bottom of the shell, an axle having an integral eye pivotally mounted on said turntable and means for retaining it thereon, and vertical driving means within the eye to engage and rotate the hub.

13. Transmission mechanism, comprising a horizontal shell, a hub rotatable thereabout, a removable turntable in the bottom of the shell, an axle having an eye mounted on the turntable in pivotal relation, a hollow pivoting member positioning said eye on said turntable, and vertical driving means within the hollow pivoting member to engage and rotate the hub.

14. Transmission mechanism, comprising a horizontal shell, a hub rotatable thereabout, a removable turntable in the bottom of the shell, an axle having an eye mounted on the turntable in pivotal relation, and a vertical drive shaft mounted within the eye and extending to engage and drive the hub.

15. Transmission mechanism, comprising a horizontal shell, a hub rotatable thereabout, a removable turntable in the bottom of the shell, an axle having an integral eye mounted on the turntable in pivotal relation, and a vertical drive shaft mounted within the eye and extending to engage and drive the hub.

16. Transmission mechanism, comprising a horizontal shell, a hub rotatable thereabout, a bearing plate in the bottom of the shell, an axle having an integral eye mounted on said plate, and means for retaining it thereon, and vertical driving means within the eye to engage and rotate the hub.

17. A horizontal shell, a hub rotatable thereabout, a turn-table mounted within the shell and on the bottom thereof, an axle having an eye mounted on the turntable in pivotal relation, and a vertical pivoting element extending through the turntable and through the eye to position the two members.

18. A horizontal shell, a hub rotatable thereabout, a turntable mounted within the shell, an axle having an eye mounted on the turntable in pivotal relation, and a vertical pivoting element extending through the turntable and through the eye to position the two members.

19. A horizontal shell, a hub rotatable thereabout, a turntable mounted within the shell, an axle having an eye mounted on the turntable in pivotal relation, and a pivoting member positioning said eye on the turntable, the said member and the eye being mounted in fixed relation with each other.

20. A horizontal shell, a hub rotatable thereabout, a removable turntable mounted within the shell, an axle having an eye mounted on the turntable in pivotal relation, and a pivoting member positioning said eye on said turntable.

21. A horizontal shell, a hub rotatable thereabout, a removable turntable mounted within the shell, an axle having an eye mounted on the turntable in pivotal relation, and a pivoting member positioning said eye on said turntable, the eye and the pivoting member being in fixed relation with each other.

22. A horizontal shell, a hub rotatable thereabout, a bearing member within the shell and mounted on the bottom thereof, an axle having an eye member mounted on the bearing member in pivotal relation, a bearing connection between said members, a pivoting element extending through both of said members, external bearing means on one end of said pivoting element, a bearing connection between said means and one of said members, and adjustable retaining means on the other end of said element to take up for wear in said bearing connections.

23. A horizontal shell, a hub rotatable thereabout, a turntable within the shell and mounted on the bottom thereof, an axle having an eye pivotally mounted on the turntable, a bearing between said eye and turntable, a pivoting element extending through said turntable and said eye and rotatable with the eye, an external flange on the lower end of said pivoting element, a bearing between said flange and the under portion of the turntable, and adjustable retaining means on the upper end of the pivoting member to take up for wear in said bearings.

24. A horizontal shell, a hub rotatable thereabout, a turntable positioned within the shell and mounted thereon, an axle having an eye mounted on the turntable in pivotal relation, and a vertical pivoting element extending through the turntable and through the eye to position the two members.

25. A horizontal shell, a hub rotatable thereabout, a turntable mounted within and on the shell, an axle having an eye mounted on the turntable in pivotal relation, and a pivoting member positioning said eye on said turntable.

26. A horizontal shell, a hub rotatable thereabout, a turntable mounted within the shell and on the bottom thereof, an axle having an eye mounted on the turntable in pivotal relation, and a pivoting member positioning said eye on said turntable.

27. A horizontal shell, a hub rotatable thereabout, a turntable mounted within the shell, an axle having an eye mounted on the turntable in pivotal relation, a pivoting member positioning said eye on said turntable, a drive shaft extending through said axle, and a driving connection between said shaft and the hub.

28. A horizontal shell, a hub rotatable thereabout, a turntable mounted within the shell, an axle having an eye mounted on the turntable in pivotal relation, a vertical pivoting element extending through the turntable and through the eye to position the two members, a drive shaft extending through said axle, and a driving connection between said shaft and the hub.

29. A horizontal shell, a hub rotatable thereabout, a turntable mounted within the shell, an axle having an eye mounted on the turntable in pivotal relation, a pivoting member positioning said eye on said turntable, a drive shaft to rotate said hub extending into said hub and shell, and a driving connection between said shaft and the hub.

30. A horizontal shell, a hub rotatable thereabout, a turntable mounted within the shell, an axle having an eye mounted on the turntable in pivotal relation, a vertical pivoting element extending through the turntable and through the eye to position the two members, a drive shaft to rotate said hub, extending into said hub and shell, and a driving connection between said shaft and the hub.

Signed, at the city and county of Denver, State of Colorado, this 4th day of September, 1919.

HARLEIGH R. HOLMES.